United States Patent
Mao et al.

(10) Patent No.: US 9,927,678 B2
(45) Date of Patent: Mar. 27, 2018

(54) VARIABLE OPTICAL ATTENUATOR COMPRISING A SWITCHABLE POLARIZATION GRATING

(71) Applicant: Huawei Technologies Co., Ltd., Shenzhen (CN)

(72) Inventors: Chongchang Mao, Wuhan (CN); Minchun Li, Wuhan (CN); Hong Min, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/360,515

(22) Filed: Nov. 23, 2016

(65) Prior Publication Data

US 2017/0075189 A1    Mar. 16, 2017

Related U.S. Application Data

(63) Continuation of application No. PCT/CN2014/089131, filed on Oct. 22, 2014.

(30) Foreign Application Priority Data

May 27, 2014 (CN) .......................... 2014 1 0228840

(51) Int. Cl.
  *G02F 1/29* (2006.01)
  *G02B 27/30* (2006.01)
  *G02F 1/139* (2006.01)

(52) U.S. Cl.
  CPC ............. *G02F 1/292* (2013.01); *G02B 27/30* (2013.01); *G02F 1/1393* (2013.01); *G02F 1/29* (2013.01);

(Continued)

(58) Field of Classification Search
  CPC .. G02F 1/292; G02F 2201/34; G02F 2203/07; G02F 1/29; G02F 2201/30; G02B 27/30
  See application file for complete search history.

(56) References Cited

U.S. PATENT DOCUMENTS 5,276,747 A    1/1994  Pan
7,034,979 B1   4/2006  Feng et al.
(Continued)

FOREIGN PATENT DOCUMENTS

CN    102725683 A    10/2012
CN    102866534 A    1/2013
(Continued)

*Primary Examiner* — Paul Lee
(74) *Attorney, Agent, or Firm* — Slater Matsil, LLP (57) ABSTRACT

Embodiments of the present invention provide a variable optical attenuator. The variable optical attenuator includes: a collimator, a switchable polarization grating, a reflector, and a voltage controller for adjusting a voltage between electrodes at both ends of a liquid crystal layer of the switchable polarization grating, where the collimator, the switchable polarization grating, and the reflector are disposed successively; the collimator is configured to receive incident light and output the incident light to the switchable polarization grating; the switchable polarization grating is configured to diffract the incident light for one time and then perform emission onto the reflector; the switchable polarization grating is further configured to diffract, for one time, a beam reflected back by the reflector, and then emit resulting diffracted light; and the collimator is further configured to receive the diffracted light and output the diffracted light.

17 Claims, 6 Drawing Sheets

(52) U.S. Cl.
CPC ...... *G02F 2201/30* (2013.01); *G02F 2201/34* (2013.01); *G02F 2203/07* (2013.01)

(56) References Cited

U.S. PATENT DOCUMENTS

| | | | |
|---|---|---|---|
| 7,295,748 | B2 | 11/2007 | Chen et al. |
| 2005/0068645 | A1 | 3/2005 | Nagaeda |
| 2006/0119916 | A1* | 6/2006 | Sutherland .......... G02F 1/13342 359/34 |
| 2006/0227283 | A1 | 10/2006 | Ooi et al. |
| 2009/0009668 | A1* | 1/2009 | Tan ...................... G02B 5/3016 349/1 |
| 2009/0040400 | A1* | 2/2009 | Nakagawa ........ G02F 1/133526 349/5 |
| 2009/0073331 | A1 | 3/2009 | Shi et al. |
| 2010/0166356 | A1* | 7/2010 | Okazaki .................. G02F 1/292 385/8 |
| 2012/0242960 | A1* | 9/2012 | Oiwa .................... G02B 27/48 353/31 |
| 2013/0194537 | A1* | 8/2013 | Mao .................. G02F 1/133528 349/196 |
| 2014/0361990 | A1* | 12/2014 | Leister .................. G02F 1/1323 345/156 |
| 2015/0022745 | A1 | 1/2015 | Kroll et al. |

FOREIGN PATENT DOCUMENTS

| | | | |
|---|---|---|---|
| CN | 103091787 | A | 5/2013 |
| CN | 103703405 | A | 4/2014 |
| JP | 2005157164 | A | 6/2005 |
| JP | 2009294604 | A | 12/2009 |
| WO | 2013113278 | A1 | 8/2013 |

\* cited by examiner

VARIABLE OPTICAL ATTENUATOR COMPRISING A SWITCHABLE POLARIZATION GRATING

CROSS-REFERENCE TO RELATED APPLICATIONS

This application is a continuation of International Application No. PCT/CN2014/089131, filed on Oct. 22, 2014, which claims priority to Chinese Patent Application No. 201410228840.3, filed on May 27, 2014. The disclosures of the aforementioned applications are hereby incorporated by reference in their entireties.

TECHNICAL FIELD

Embodiments of the present invention relate to the field of optical technologies, and in particular, to a variable optical attenuator.

BACKGROUND

A variable optical attenuator (VOA) is widely applied in optical communications, and it has a main function of dynamically controlling attenuation of an optical signal and is an indispensable key component in an optical network. The variable optical attenuator is generally required to have a wide attenuation range, high precision, high stability, a small size, and a low cost. Currently, in an optical communications system, two main technologies for implementing a high-end variable optical attenuator are available: a micro electro mechanical system (MEMS) technology and a liquid crystal (LC)+optical wedge technology.

A VOA based on the MEMS technology controls an attenuation extent of light by using a tilt angle of an MEMS micro reflector, and has a small size but low shockproof performance. Due to use of a birefringent wedge, a VOA based on the LC+optical wedge technology is large in size, costly, and has a problem of being difficult to align an optical path.

SUMMARY

Embodiments of the present invention provide a variable optical attenuator to resolve problems, namely, low shockproof performance, a large size, and a high cost, of an existing variable optical attenuator.

According to a first aspect, an embodiment of the present invention provides a variable optical attenuator includes a collimator, a switchable polarization grating SPG, a reflector, and a voltage controller for adjusting a voltage between electrodes at both ends of a liquid crystal layer of the SPG. The collimator, the SPG, and the reflector are disposed successively. The collimator is configured to receive incident light and output the incident light to the SPG. The SPG is configured to diffract the incident light for one time and then perform emission onto the reflector. The SPG is further configured to diffract, for one time, a beam reflected back by the reflector, and then emit resulting diffracted light. The collimator is further configured to receive the diffracted light and output the diffracted light.

In a first possible implementation manner of the first aspect, when the voltage controller adjusts a voltage at both ends of the SPG to a low voltage or a zero voltage, that the SPG is configured to diffract the incident light for one time and then perform emission onto the reflector includes performing, by the SPG, +1$^{st}$ order diffraction on a left hand circular polarization state in the incident light for one time so that the polarization state changes to a right hand circular polarization state, and then performing emission onto the reflector; and performing, by the SPG, −1$^{st}$ order diffraction on a right hand circular polarization state in the incident light for one time so that the polarization state changes to a left hand circular polarization state, and then performing emission onto the reflector. The reflector is configured to reflect the right hand circular polarization state/left hand circular polarization state in the received incident light into a left hand circular polarization state/right hand circular polarization state, and then perform emission onto the SPG. The SPG is further configured to diffract, for one time, a beam reflected back by the reflector, and then emit resulting diffracted light to the collimator by performing, by the SPG, +1$^{st}$ order diffraction, for one time, on the left hand circular polarization state reflected back by the reflector, so that the polarization state changes to a right hand circular polarization state, and then performing emission in a direction parallel to an optical axis; and performing, by the SPG, −1$^{st}$ order diffraction, for one time, on the right hand circular polarization state reflected back by the reflector, so that the polarization state changes to a left hand circular polarization state, and then performing emission in the direction parallel to the optical axis. When the voltage controller adjusts the voltage at both ends of the SPG to a high voltage, that the SPG is configured to diffract the incident light for one time and then perform emission onto the reflector includes: performing, by the SPG, 0$^{th}$ order diffraction on the left hand circular polarization state/right hand circular polarization state in the incident light for one time, and then performing emission onto the reflector, where the reflector is configured to directly reflect diffracted light, which is emitted after the SPG performs the 0$^{th}$ order diffraction for one time, back to the collimator.

With reference to the first aspect or the first possible implementation manner of the first aspect, in a second possible implementation manner of the first aspect, a quarter-wave plate is further disposed between the SPG and the reflector, and when the voltage controller adjusts the voltage at both ends of the SPG to a low voltage or a zero voltage, that the SPG is configured to diffract the incident light for one time and then perform emission onto the reflector includes: performing, by the SPG, +1$^{st}$ order diffraction on the left hand circular polarization state in the incident light for one time so that the polarization state changes to a right hand circular polarization state, and then performing emission onto the reflector through the quarter-wave plate; and performing, by the SPG, −1$^{st}$ order diffraction on the right hand circular polarization state in the incident light for one time so that the polarization state changes to a left hand circular polarization state, and then performing emission onto the reflector through the quarter-wave plate. The quarter-wave plate and the reflector are configured to reflect the right hand circular polarization state/left hand circular polarization state in the received incident light into a right hand circular polarization state/left hand circular polarization state, and then perform emission onto the SPG. The SPG is further configured to diffract, for one time, a beam reflected back by the reflector, and then emit resulting diffracted light by: performing, by the SPG, +1$^{st}$ order diffraction, for one time, on the left hand circular polarization state reflected back by the reflector, so that the polarization state changes to a right hand circular polarization state, and then performing oblique emission at a specific angle; and performing, by the SPG, −1$^{st}$ order diffraction, for one time, on the right hand circular polarization state reflected back by the reflector, so that the polarization state changes to a left hand circular polarization state, and then performing oblique emission at a specific angle. When the voltage controller adjusts the voltage at both ends of the SPG to a high voltage, that the SPG is configured to diffract the incident light for one time and then perform emission onto the reflector includes performing, by the SPG, $0^{th}$ order diffraction on the left hand circular polarization state/right hand circular polarization state in the incident light for one time, and then performing emission onto the reflector. The reflector is configured to directly reflect the diffracted light, which is emitted after the SPG performs the $0^{th}$ order diffraction for one time, back to the collimator.

With reference to the second possible implementation manner of the first aspect, in a third possible implementation manner of the first aspect, a liquid crystal part LC is further disposed between the SPG and the quarter-wave plate, the voltage controller is further configured to adjust a voltage between electrodes at both ends of the LC, and the LC is configured to implement wavelength dependent loss compensation.

According to a second aspect, an embodiment of the present invention provides a variable optical attenuator, includes a collimator, a polymer polarization grating PPG, a liquid crystal part LC, a reflector, and a voltage controller for adjusting a voltage between electrodes at both ends of the LC. The collimator, the PPG, the LC, and the reflector are disposed successively. The collimator is configured to receive incident light and output the incident light to the PPG. The PPG is configured to diffract the incident light for one time and then perform emission onto the reflector through the LC. The LC is configured to change a polarization state of a beam with a voltage change. The PPG is further configured to diffract, for one time, a beam that is reflected back by the reflector and whose polarization state is changed by the LC, and then emit resulting diffracted light. The collimator is further configured to receive the diffracted light and output the diffracted light.

In a first possible implementation manner of the second aspect, the LC is an electrically controlled birefringence ECB-type LC, and when the voltage controller adjusts a voltage at both ends of the ECB-type LC to a low voltage or a zero voltage, the ECB-type LC is a quarter-wave plate, and that the PPG is configured to diffract the incident light for one time and then perform emission onto the reflector through the LC includes performing, by the PPG, $+1^{st}$ order diffraction on the left hand circular polarization state in the incident light for one time so that the polarization state changes to a right hand circular polarization state, and then performing emission onto the reflector through the LC; and performing, by the PPG, $-1^{st}$ order diffraction on the right hand circular polarization state in the incident light for one time so that the polarization state changes to a left hand circular polarization state, and then performing emission onto the reflector through the LC. The LC and the reflector are configured to reflect the right hand circular polarization state/left hand circular polarization state in the received incident light into a right hand circular polarization state/left hand circular polarization state, and then perform emission onto the PPG. The PPG is further configured to diffract, for one time, a beam that is reflected back by the reflector and whose polarization state is changed by the LC, and then emit resulting diffracted light by performing, by the PPG, $+1^{st}$ order diffraction, for one time, on the left hand circular polarization state reflected back by the reflector, so that the polarization state changes to a right hand circular polarization state, and then performing oblique emission at a specific angle; and performing, by the PPG, $-1^{st}$ order diffraction, for one time, on the right hand circular polarization state reflected back by the reflector, so that the polarization state changes to a left hand circular polarization state, and then performing oblique emission at a specific angle. When the voltage controller adjusts the voltage at both ends of the ECB-type LC to a high voltage, the ECB-type LC is similar to a wave plate whose phase difference is 0, and that the PPG is configured to diffract the incident light for one time and then perform emission onto the reflector through the LC by performing, by the PPG, $+1^{st}$ order diffraction on a left hand circular polarization state in the incident light for one time so that the polarization state changes to a right hand circular polarization state, and then performing emission onto the reflector through the LC; and performing, by the PPG, $-1^{st}$ order diffraction on a right hand circular polarization state in the incident light for one time so that the polarization state changes to a left hand circular polarization state, and then performing emission onto the reflector through the LC. The LC and the reflector are configured to reflect the right hand circular polarization state/left hand circular polarization state in the received incident light into a left hand circular polarization state/right hand circular polarization state, and then perform emission onto the PPG. The PPG is further configured to diffract, for one time, a beam that is reflected back by the reflector and whose polarization state is changed by the LC, and then emit resulting diffracted light includes: performing, by the PPG, $+1^{st}$ order diffraction, for one time, on the left hand circular polarization state reflected back by the reflector, so that the polarization state changes to a right hand circular polarization state, and then performing emission in a direction parallel to an optical axis; and performing, by the PPG, $-1^{st}$ order diffraction, for one time, on the right hand circular polarization state reflected back by the reflector, so that the polarization state changes to a left hand circular polarization state, and then performing emission in the direction parallel to the optical axis.

With reference to the first possible implementation manner of the second aspect, in a second possible implementation manner of the second aspect, a quarter-wave plate is further disposed between the ECB-type LC and the reflector.

With reference to the second aspect, in a third possible implementation manner of the second aspect, the LC is a vertical alignment VA-type LC.

With reference to the variable optical attenuator according to the second aspect or any one of the first to third possible implementation manners of the second aspect, in a fourth possible implementation manner of the second aspect, a PPG is further disposed between the collimator and the PPG, and $\pm 1^{st}$ order diffraction and $\mp 1^{st}$ order diffraction occur for one time separately when the incident light output by the collimator passes through the two PPGs successively; and $\mp 1^{st}$ order diffraction and $\pm 1^{st}$ order diffraction occur for one time separately when light reflected back by the reflector and the LC passes through the two PPGs successively.

With reference to the second aspect, in a fifth possible implementation manner of the second aspect, the LC is an electrically controlled birefringence ECB-type LC, a PPG and a quarter-wave plate are further successively disposed between the ECB-type LC and the reflector, and when the voltage controller adjusts a voltage at both ends of the ECB-type LC to a high voltage, the ECB-type LC does not adjust a polarization state of the light. When the voltage controller adjusts the voltage at both ends of the ECB-type LC to a low voltage or a zero voltage, the ECB-type LC serves as a half-wave plate to adjust the polarization state of the light; $\pm 1^{st}$ order diffraction and $\mp 1^{st}$ order diffraction occur for one time separately when the incident light output by the collimator passes through the two PPGs successively; and $\mp 1^{st}$ order diffraction and $\pm 1^{st}$ order diffraction occur for one time separately when light reflected back by the reflector and the quarter-wave plate passes through the two PPGs successively.

The variable optical attenuator provided in the embodiment of the present invention makes use of three-order diffraction of an SPG, and uses a collimator and a reflector together; a voltage controller adjusts a voltage at both ends of the SPG to change between a low voltage or a zero voltage and a high voltage; in a whole process, diffraction occurs for two times, and therefore, the VOA has an extremely wide dynamic range and is variable in a 0-40 dB range. In the embodiment of the present invention, the voltage controller adjusts diffraction efficiency of the SPG by adjusting the voltage at both ends of the SPG, and therefore, compared with mechanical adjustment in the prior art, the VOA in the embodiment of the present invention has an advantage of high reliability. In addition, by virtue of a structure characteristic of the SPG used together with the collimator and the reflector, the VOA according to the embodiment of the present invention has a small size and a low cost.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

An embodiment of the present invention provides a variable optical attenuator. By using liquid crystal technology-based gratings: a switchable polarization grating (SPG) and a polymer polarization grating (PPG) and using a liquid crystal part (LC) together with a wave plate, a Dark-type VOA and a Bright-type VOA are formed. The VOA provided in this embodiment of the present invention gives high performance and is characterized by high reliability, a small size, and a low cost, and is detailed below with reference to accompanying drawings.

First, making and working principles of an SPG are described. A structure and a making process of the SPG are extremely similar to making of a conventional LC plate. The main difference lies in making of a liquid crystal alignment layer. The liquid crystal alignment layer of the SPG is formed by exposing a polymer layer to two beams of UV coherent polarized light. One of the beams is right hand polarized light, and the other beam is left hand polarized light. After an LC is injected between two glass substrates, molecular orientation of the LC is arranged according to a holographic pattern formed on the alignment layer after the exposing. When no voltage is applied, the LC forms a liquid crystal grating, which may diffract incident light. When a power supply at both ends of the SPG is higher than a specific threshold voltage, molecules of the LC start deflecting to an electric field direction. When a voltage is high enough, the molecules of the LC are arranged according to the electric field direction, and a grating effect almost disappears completely.

Figure 1:
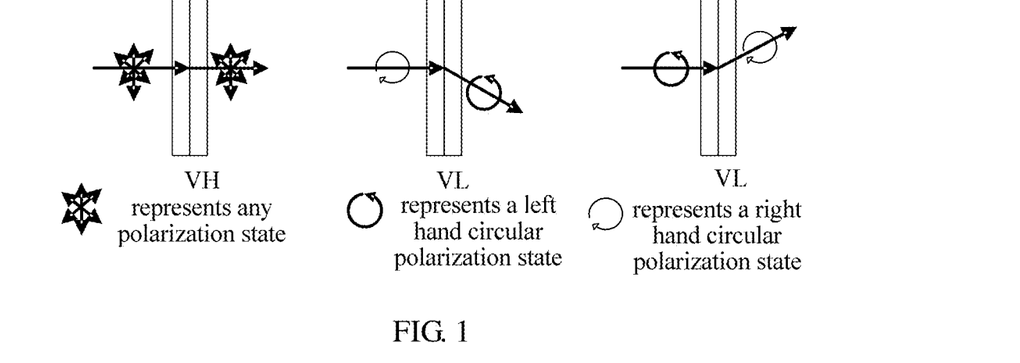
FIG. 1 is a schematic diagram of a polarization state before and after incident light is diffracted by an SPG.

The SPG has three diffraction orders: a $0^{th}$ order and $\pm 1^{st}$ orders. Depending on a polarization state of the incident light, the incident light may be decomposed into a beam of a left hand circular polarization state and a beam of a right hand circular polarization state. FIG. 1 is a schematic diagram of a polarization state before and after incident light is diffracted by an SPG. As shown in FIG. 1, when a high voltage VH is applied to both ends of the SPG, the incident light of any polarization state is diffracted to the $0^{th}$ order after passing through the SPG, and the polarization state and a propagation direction are unchanged; when a zero voltage or a low voltage VL is applied to both ends of the SPG, the left hand circular polarization state is diffracted to the $+1^{st}$ order and changes to a right hand circular polarization state, and the right hand circular polarization state is diffracted to the $-1^{st}$ order and changes to a left hand circular polarization state.

When a voltage applied to both ends of the SPG is a value between the VL and the VH, a probability η of diffracting the left hand circular polarization state and the right hand circular polarization state of the incident light to the $0^{th}$ order and the $\pm 1^{st}$ orders is represented by the following formulas.

$$o^{th} \text{ order: } \eta = \cos^2\left(\frac{\pi \Delta n d}{\lambda}\right) \quad (1)$$

$$\pm 1^{st} \text{ orders: } \eta = \frac{1}{2}\sin^2\left(\frac{\pi \Delta n d}{\lambda}\right) \quad (2)$$

where Δn is a birefringence of the SPG, d is a thickness of the liquid crystal, and λ is a wavelength of the light.

Figure 2:
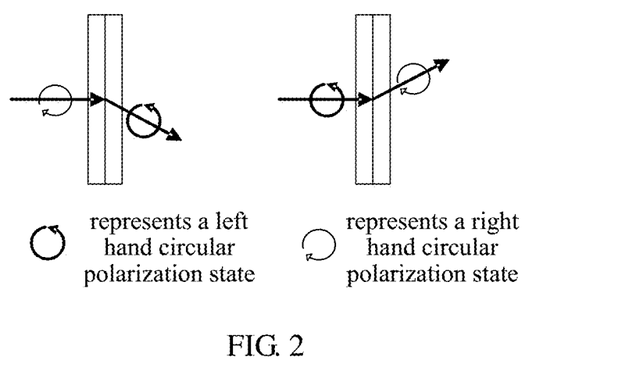
FIG. 2 is a schematic diagram of a polarization state before and after incident light is diffracted by a PPG.

Subsequently, making and working principles of a PPG are described. The PPG is formed by exposing a pair of curable liquid crystal layers. A making process of the PPG is: First, a glass substrate is coated with a light-sensitive polymer material, then the glass substrate is exposed to two beams of coherent light to form a hologram, a light-sensitive layer is coated with curable liquid crystals, and then the liquid crystal layers are exposed to uniform UV light, so as to cure the liquid crystal layers. In this case, liquid crystal molecules are laid out according to the hologram of the light-sensitive layer to form a fixed grating. The PPG is a fixed grating, and therefore, diffraction efficiency of the PPG cannot be changed by applying a voltage. The PPG has only two diffraction orders: ±1$^{st}$ orders. FIG. 2 is a schematic diagram of a polarization state before and after incident light is diffracted by a PPG. As shown in FIG. 2, the left hand circular polarization state is diffracted to the +1$^{st}$ order and changes to a right hand circular polarization state, and the right hand circular polarization state is diffracted to the −1$^{st}$ order and changes to a left hand circular polarization state. The PPG has only two light output directions.

Figure 3:
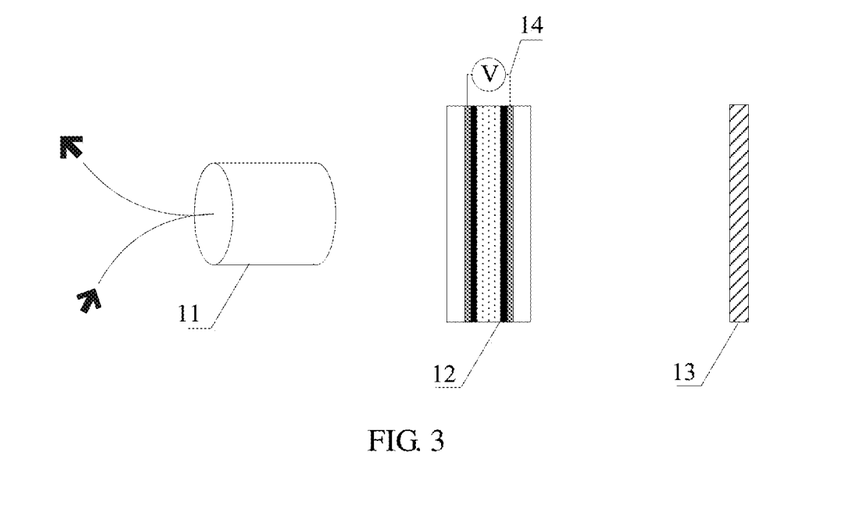
FIG. 3 is a schematic structural diagram of Embodiment 1 of a VOA according to the present invention.

FIG. 3 is a schematic structural diagram of Embodiment 1 of a VOA according to the present invention. As shown in FIG. 3, the VOA in this embodiment may include: a collimator 11, an SPG 12, a reflector 13, and a voltage controller 14 for adjusting a voltage between electrodes at both ends of a liquid crystal layer of the SPG 12, where the collimator 11, the SPG 12, and the reflector 13 are disposed successively, and after the three are disposed successively, an optical path needs to be aligned, and the reflector 13 and the optical path are disposed in a strictly vertical manner. Both the SPG 12 and the reflector 13 are disposed vertical to a direction of the optical path, and the voltage controller 14 may, for example, be disposed between the electrodes at both ends of the liquid crystal layer of the SPG 12. The collimator 11 is configured to receive incident light and output the incident light to the SPG 12. The SPG 12 is configured to diffract the incident light for one time, and then perform emission onto the reflector 13. The SPG 12 is further configured to diffract, for one time, a beam reflected back by the reflector 13, and then emit resulting diffracted light. The collimator 11 is further configured to receive the diffracted light and output the diffracted light.

Figure 4:
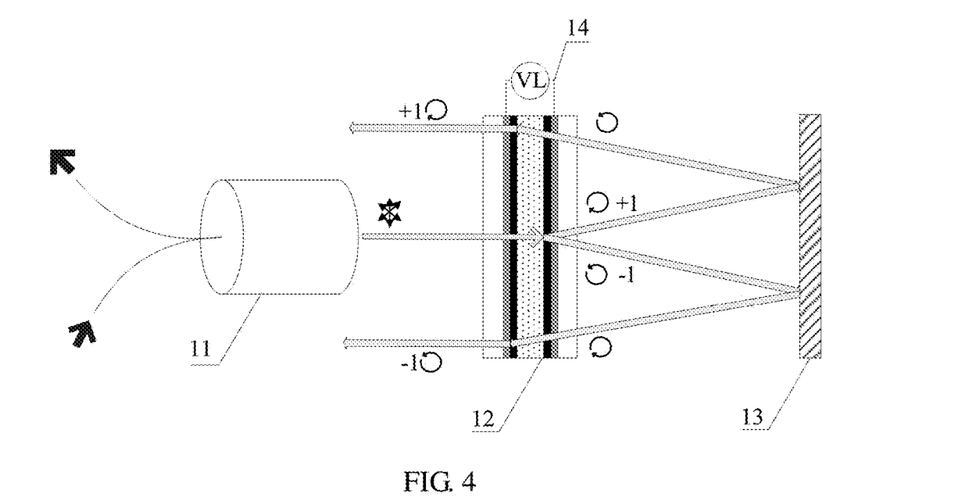
FIG. 4 is a schematic diagram of attenuation when a voltage at both ends of an SPG is a low voltage or a zero voltage.

Specifically, the voltage controller 14 adjusts the voltage at both ends of the SPG 12 to change between a low voltage or a zero voltage and a high voltage VH. When the voltage at both ends of the SPG 12 is a low voltage or a zero voltage, FIG. 4 is a schematic diagram of attenuation when the voltage at both ends of the SPG is a low voltage or a zero voltage. As shown in FIG. 4, after the incident light is emitted from the collimator and arrives at the SPG 12, a left hand circular polarization state in the incident light undergoes +1$^{st}$ order diffraction performed by the SPG 12 for one time, and then changes to a right hand circular polarization state and passes through the reflector. Reflected light forms a left hand circular polarization state when returning to the SPG 12. Subsequently, +1$^{st}$ order diffraction is performed once again on the SPG 12, and the light changes to a right hand circular polarization state. When being emitted, the right hand circular polarization state is emitted as parallel light in a direction opposite to a direction of the incident light. When a diffraction angle of the SPG 12 is relatively large, returned light is relatively far away from an axis and unable to enter the collimator 11. In this case, attenuation of the light is maximal.

A right hand circular polarization state in the incident light undergoes −1$^{st}$ order diffraction performed by the SPG 12 for one time, and then changes to a left hand circular polarization state and passes through the reflector. Reflected light forms a right hand circular polarization state when returning to the SPG 12. Subsequently, −1$^{st}$ order diffraction is performed once again on the SPG 12, and the light changes to a left hand circular polarization state. When being emitted, the left hand circular polarization state is emitted as parallel light in a direction opposite to the direction of the incident light. When a diffraction angle of the SPG 12 is relatively large, returned light is relatively far away from an axis and unable to enter the collimator 11. In this case, attenuation of the light is maximal.

Figure 5:
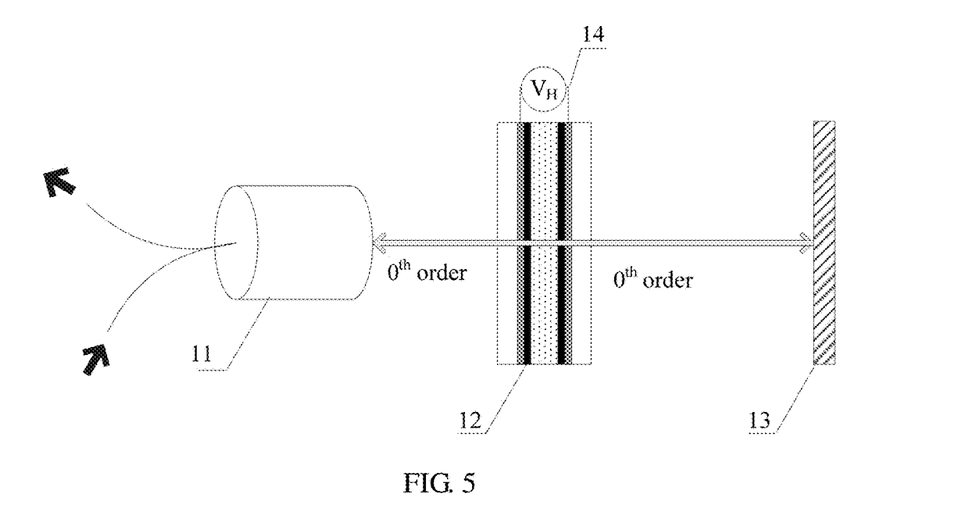
FIG. 5 is a schematic diagram of attenuation when a voltage at both ends of an SPG is a high voltage.

When the voltage at both ends of the SPG 12 is a high voltage, FIG. 5 is a schematic diagram of attenuation when the voltage at both ends of the SPG is a high voltage. As shown in FIG. 5, regardless of a polarization state, the incident light is diffracted to the 0$^{th}$ order, and is directly reflected from the reflector back to the collimator 11 and output. In this case, attenuation of the VOA is minimal.

When the voltage at both ends of the SPG is any value between 0 and VH, a proportion of the incident light diffracted to the 0$^{th}$ order to the incident light diffracted to ±1$^{st}$ orders changes with the voltage. Refer to the foregoing formula (1) and formula (2). An attenuation value of the VOA decreases with increase of the voltage.

The VOA provided in this embodiment makes use of three-order diffraction of an SPG, and uses a collimator and a reflector together; a voltage controller adjusts a voltage at both ends of the SPG to change between a low voltage or a zero voltage and a high voltage; in a whole process, effective diffraction occurs for two times, and therefore, the VOA has an extremely wide dynamic range and is variable in a 0-40 dB range. In this embodiment of the present invention, the voltage controller adjusts diffraction efficiency of the SPG by adjusting the voltage at both ends of the SPG, and therefore, compared with mechanical adjustment in the prior art, the VOA in this embodiment of the present invention has an advantage of high reliability. In addition, by virtue of a structure characteristic of the SPG used together with the collimator and the reflector, the VOA according to this embodiment of the present invention has a small size and a low cost.

Figure 6:
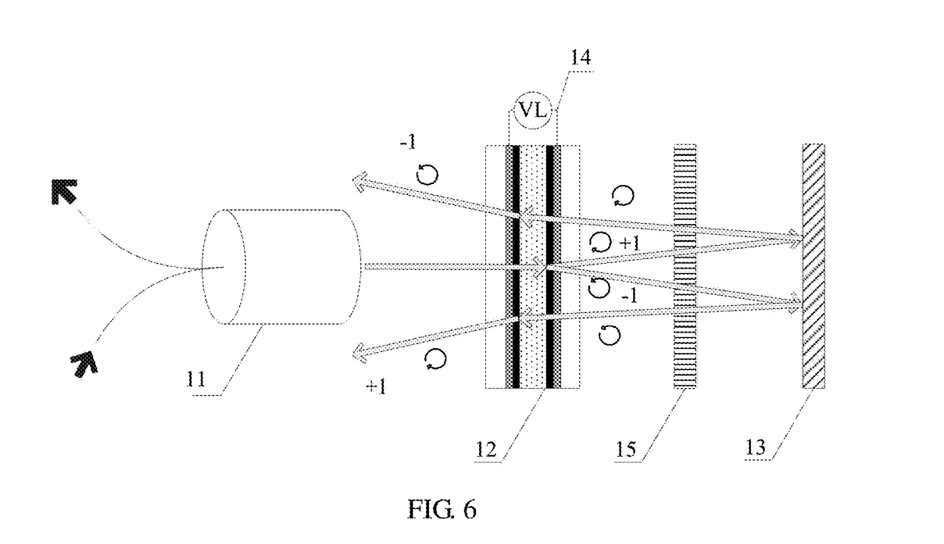
FIG. 6 is a schematic structural diagram of Embodiment 2 of a VOA according to the present invention.

In the foregoing embodiment, the SPG may have different diffraction efficiency for different polarized light, thereby causing a polarization dependent loss (PDL). To reduce the PDL, further, a quarter-wave plate may be included. FIG. 6 is a schematic structural diagram of Embodiment 2 of a VOA according to the present invention. As shown in FIG. 6, on the basis of the VOA shown in FIG. 3, a quarter-wave plate 15 is further disposed between the SPG and the reflector 13. A detailed working principle is as follows:

When a voltage at both ends of the SPG 12 is a low voltage or a zero voltage, after incident light is emitted from the collimator 11 and arrives at the SPG 12, a left hand circular polarization state in the incident light undergoes +1$^{st}$ order diffraction performed by the SPG 12 for one time, and then changes to a right hand circular polarization state and passes through the reflector and the quarter-wave plate.

Reflected light forms a right hand circular polarization state when returning to the SPG 12. Subsequently, $-1^{st}$ order diffraction is further performed on the SPG 12, and the light changes to a left hand circular polarization state. When being emitted, the left hand circular polarization state is emitted obliquely at a specific angle without entering the collimator 11. A right hand circular polarization state in the incident light undergoes $-1^{st}$ order diffraction performed by the SPG 12 for one time, and then changes to a left hand circular polarization state and passes through the reflector and the quarter-wave plate. Reflected light forms a left hand circular polarization state when returning to the SPG 12. Subsequently, $+1^{st}$ order diffraction is further performed on the SPG 12, and the light changes to a right hand circular polarization state. When being emitted, the right hand circular polarization state is emitted obliquely at a specific angle without entering the collimator 11. In this case, attenuation of the VOA is maximal.

When the voltage at both ends of the SPG 12 is a high voltage, similar to FIG. 5, regardless of a polarization state, the incident light is diffracted to a $0^{th}$ order, and is directly reflected from the reflector back to the collimator 11 and output. In this case, the attenuation of the VOA is minimal.

When the voltage at both ends of the SPG is any value between 0 and VH, a proportion of the incident light diffracted to the $0^{th}$ order to the incident light diffracted to $\pm 1^{st}$ orders changes with the voltage. Refer to the foregoing formula (1) and formula (2). An attenuation value of the VOA decreases with increase of the voltage.

In this embodiment, the light finally returned to the collimator is the light diffracted twice by the SPG to the $0^{th}$ order. The polarization state of the incident light may be decomposed into P polarized light and S polarized light. After being diffracted to the $0^{th}$ order, light of a P polarization state passes through the reflector and the quarter-wave plate, and changes to an S polarization state when returning to the SPG. Contrarily, after being diffracted to the $0^{th}$ order, an S polarization state passes through the reflector and the quarter-wave plate, and changes to a P polarization state when returning to the SPG. Therefore, the light that finally enters the collimator is exactly a product of $0^{th}$ order diffraction efficiency of the two orthogonal polarization states. For any input light polarization state, demonstrated diffraction efficiency is the same, thereby implementing automatic compensation for the PDL.

In the VOA shown in FIG. 6, from the formula (1), it can be seen that $0^{th}$ order diffraction efficiency of the SPG is dependent on a wavelength. When the voltage at both ends of the SPG is between 0 and $V_H$, the $0^{th}$ order diffraction efficiency of a long wavelength is greater than that of a short wavelength at a smaller loss than that of the short wavelength, and a wavelength dependent loss (Wavelength dependent loss, hereinafter referred to briefly as WDL) is generated. To reduce the WDL, the present invention gives another VOA structure.

Figure 7:
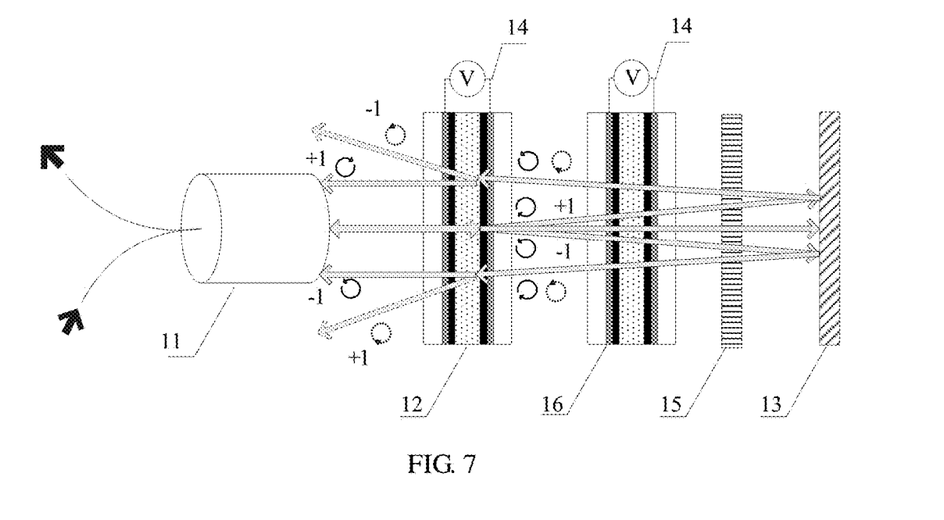
FIG. 7 is a schematic structural diagram of Embodiment 3 of a VOA according to the present invention.

FIG. 7 is a schematic structural diagram of Embodiment 3 of a VOA according to the present invention. As shown in FIG. 7, on the basis of the VOA shown in FIG. 6, an LC 16 is further disposed between the switchable polarization grating and the quarter-wave plate. In this case, the voltage controller 14 is configured to adjust a voltage at both ends of the SPG 12 and a voltage at both ends of the LC 16. Specifically, a phase difference $$\Delta \psi = \frac{\pi \Delta n d}{\lambda}$$

generated by an LC o/e optical path difference varies between a long wavelength and a short wavelength, and therefore, the LC may generate a WDL. By selecting long and short axis directions of the LC that are opposite to that of the wave plate, the WDL of the LC counteracts a WDL of another part to some extent, so as to implement WDL compensation.

A specific working principle is as follows: A right hand/left hand circular polarization state formed after a first time of diffraction performed by the SPG passes through the LC, the quarter-wave plate, and the reflector, and then forms right hand/left hand circular polarized light when returning to the SPG. The SPG performs diffraction for a second time to $\mp 1^{st}$ orders, and performs oblique emission. When the phase difference generated by the LC and the wave plate is not equal to $\pi/2$, the light returned to the SPG is not a pure right hand/left hand polarization state, but includes some left hand/right hand polarization states. The some included light undergoes $\pm 1^{st}$ order diffraction, and is emitted in parallel and coupled back to an output fiber to serve as a supplement to $0^{th}$ order light, thereby implementing compensation for the WDL.

Light energy output efficiency may be calculated according to the following formula (3).

$$\eta = \cos^4\left(\frac{\pi \Delta n_1 d_1}{\lambda}\right) + A^2 \sin^4\left(\frac{\pi \Delta n_1 d_1}{\lambda}\right) \cos^2\left(\frac{\pi \Delta n_2 d_2}{\lambda} - \frac{\pi \Delta L}{\lambda}\right) \quad (3)$$

Where, $$\cos^4\left(\frac{\pi \Delta n_1 d_1}{\lambda}\right)$$

represents light energy of $0^{th}$ order diffraction performed twice; the $$A^2 \sin^4\left(\frac{\pi \Delta n_1 d_1}{\lambda}\right) \cos^2\left(\frac{\pi \Delta n_2 d_2}{\lambda} - \frac{\pi \Delta L}{\lambda}\right)$$

factor reflects a function of the LC, and means that a part is extracted, from the part of light energy emitted obliquely, to serve as WDL compensation light. In the formula, $\Delta n_1$ and $\Delta n_2$ are birefringence differences of the SPG and the LC respectively, $d_1$ and $d_2$ are liquid crystal layer thicknesses of the SPG and the LC respectively, $\Delta L$ is an optical path difference of the wave plate, $\lambda$ is a wavelength of the light, and A is a coupling percentage of the $\pm^{st}$ order light and the collimator. By selecting proper parameters and by only applying a voltage equal to the voltage of the SPG onto the LC, WDL compensation in a full dynamic range can be performed, without needing additional adjustment by applying different voltage values. With such a group of parameters, a simulation result of the formula (3) shows that the WDL can decrease, within an attenuation range 0-30 dB of the VOA, from 3 dB existent before the compensation to 0.63 dB.

All the foregoing embodiments are VOAs based on SPGs. The following describes in detail a PPG-based VOA provided in an embodiment of the present invention.

Figure 8:
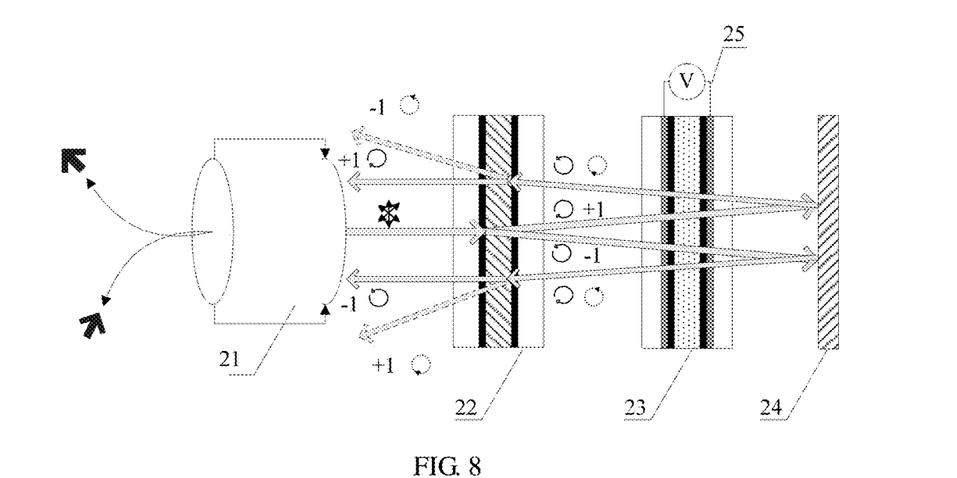
FIG. 8 is a schematic diagram of a structure and a working principle of Embodiment 4 of a VOA according to the present invention.

FIG. 8 is a schematic diagram of a structure and a working principle of Embodiment 4 of a VOA according to the present invention. As shown in FIG. 8, the VOA in this embodiment may include: a collimator 21, a PPG 22, an LC 23, a reflector 24, and a voltage controller 25 for adjusting a voltage at both ends of the LC 23, where the collimator 21, the PPG 22, the LC 23, and the reflector 24 are disposed successively; as shown in FIG. 8, the PPG 22, the LC 23, and the reflector 24 are all disposed in a direction vertical to an optical path, and after the four are disposed successively, the optical path needs to be aligned, and the reflector 24 and the optical path are disposed in a strictly vertical manner. The collimator 21 is configured to receive incident light and output the incident light to the PPG 2. The PPG 22 is configured to diffract the incident light for one time and then perform emission onto the reflector 24 through the LC 23. The LC 23 is configured to change a polarization state of a beam with a voltage change. The PPG 22 is further configured to diffract, for one time, a beam that is reflected back by the reflector 24 and whose polarization state is changed by the LC 23, and then emit resulting diffracted light. The collimator 21 is further configured to receive the diffracted light and output the diffracted light.

Specifically, the LC 23 may be an electrically controlled birefringence (Electrically Controlled Birefringence, hereinafter referred to briefly as ECB)-type LC or a vertical alignment (Vertical Alignment, hereinafter referred to briefly as VA)-type LC.

1. When the LC 23 is an ECB-type LC, the voltage controller 14 adjusts the voltage at both ends of the ECB-type LC to change between a low voltage or a zero voltage and a high voltage VH. As shown in FIG. 8, by applying a voltage to both ends of the LC, a phase difference of light can be adjusted, so that a polarization state of the light is adjusted. When light is incident onto the PPG from the collimator, the incident light of a left hand circular polarization state and the incident light of a right hand circular polarization state are diffracted to a $+1^{st}$ order and a $-1^{st}$ order respectively, and are emitted as a right hand circular polarization state and a left hand circular polarization state. When the voltage at both ends of the LC is 0, the ECB-type LC is a quarter-wave plate, which can change the polarization state of the light. When the light passes through the reflector and the LC and returns to the PPG, the light becomes a right hand circular polarization state and a left hand circular polarization state separately. The diffraction that occurs for a second time on the PPG is of $\mp 1^{st}$ orders. The diffracted light is emitted obliquely at a relatively large angle, without entering the collimator and an output fiber. In this case, attenuation of the VOA is maximal. When a high voltage $V_H$ is applied to both ends of the LC, the ECB-type LC is equivalent to a wave plate whose phase difference is 0. The light reflected by the reflector back to the PPG is a left hand circular polarization state and a right hand circular polarization state, diffracted on the PPG for a second time, and emitted as $\pm^{st}$ orders in a horizontal direction, and returned to the collimator and the output fiber. In this case, the attenuation of the VOA is minimal.

When the voltage applied to both ends of the LC changes in a $0$-$V_H$ range, an attenuation value of the light decreases with increase of the voltage. Therefore, an extent of light attenuation caused by the VOA may be controlled by adjusting the voltage applied to both ends of the LC.

A probability η of diffracting the incident light to the $\pm 1^{st}$ orders is expressed by the following formula (4).

$$\eta = \cos^2\left(\frac{\pi \Delta n d}{\lambda}\right) \quad (4)$$

In the formula, Δn is a birefringence difference of the LC, d is a thickness of a liquid crystal layer of the LC, and λ is a wavelength of the light. After the polarization state of the light is changed by controlling the LC, diffraction occurs for only one time on the PPG. In this embodiment, a dynamic range of the VOA is 0-25 dB variable.

Figure 9:
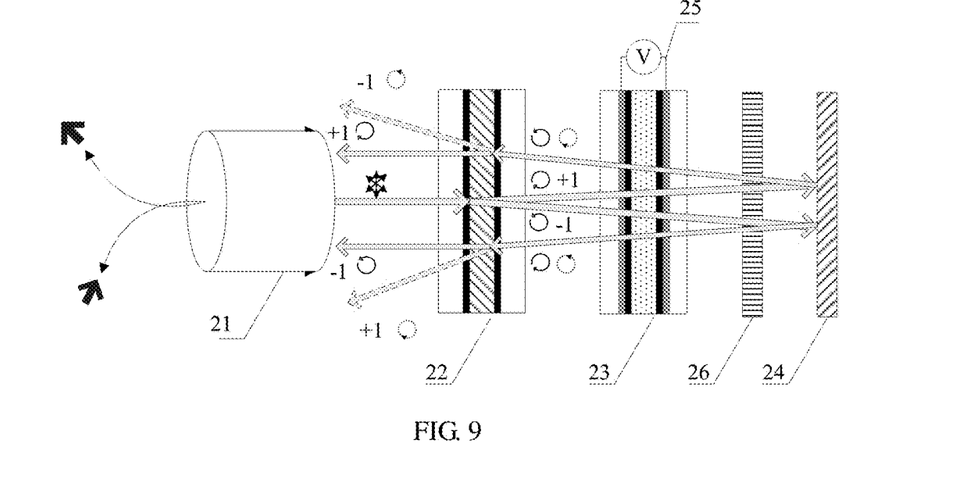
FIG. 9 is a schematic diagram of a structure and a working principle of Embodiment 5 of a VOA according to the present invention.

Further, when the LC is an ECB-type LC, on the basis of the foregoing embodiments, alternatively, a quarter-wave plate may be added between the ECB-type LC and the reflector to form a Bright-type VOA. FIG. 9 is a schematic diagram of a structure and a working principle of Embodiment 5 of a VOA according to the present invention. As shown in FIG. 9, a quarter-wave plate 26 is further disposed between the ECB-type LC and the reflector 24. In this case, the probability η of diffracting the incident light to the $\pm 1^{st}$ orders is expressed by the following formula (5).

$$\eta = \cos^2\left(\frac{\pi \Delta n d + \pi \Delta L}{\lambda}\right) \quad (5)$$

In the formula, Δn is a birefringence difference of the LC, d is a thickness of the liquid crystal layer of the LC, ΔL is an optical path difference of the wave plate, and λ is a wavelength of the light.

In this embodiment, the dynamic range of the VOA is 0-25 dB variable. With a 0-20 dB attenuation range, the WDL is within 0.7 dB. The Bright-type VOA in this embodiment can meet a requirement imposed by an optical communications system on a high-end Bright-type VOA.

2. When the LC 23 is a VA-type LC, the voltage controller 14 adjusts the voltage at both ends of the VA-type LC to change between a low voltage or a zero voltage and a high voltage VH. In this case, the probability η of diffracting the incident light to the $\pm 1^{st}$ orders is expressed by the following formula (6).

$$\eta = \cos^2\left(\frac{\pi \Delta n d}{\lambda}\right) \quad (6)$$

In the formula, Δn is a birefringence difference of the LC, d is a thickness of the liquid crystal layer of the LC, and λ is a wavelength of the light.

Because effective diffraction occurs on the PPG for one time, the dynamic range of the VOA in this case is 0-25 dB variable. WDL<0.6 dB@IL=0-15 dB, which meets the requirement of the optical communications system for the high-end Bright-type VOA.

The VOA provided in this embodiment makes use of two-order diffraction of a PPG, and uses an LC, a collimator, and a reflector together; a voltage controller adjusts a voltage at both ends of the LC to change between a low voltage or a zero voltage and a high voltage; and the VOA has a dynamic range of 0-25 dB. In this embodiment of the present invention, the voltage controller adjusts diffraction efficiency of the PPG by adjusting the voltage at both ends of the LC, and therefore, compared with mechanical adjustment in the prior art, the VOA in this embodiment of the present invention has an advantage of high reliability. In addition, by virtue of a structure characteristic of the PPG used together with the LC, the collimator, and the reflector, the VOA according to this embodiment of the present invention has a small size and a low cost.

Figure 10:
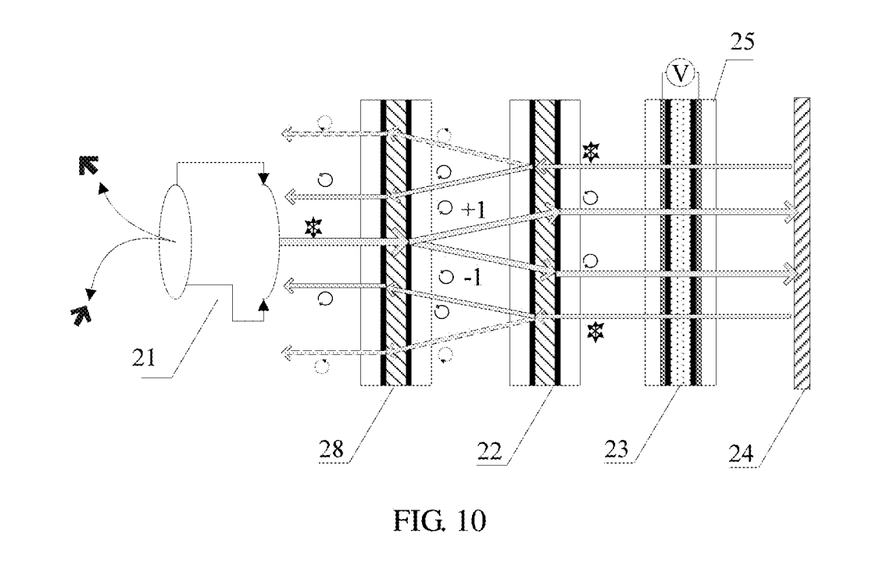
FIG. 10 is a schematic diagram of a structure and a working principle of Embodiment 6 of a VOA according to the present invention.

On the basis of the embodiments shown in FIG. 8 and FIG. 9, in order to further widen the dynamic range of the VOA, two levels of PPGs may be used. That is, a polymer polarization grating is further disposed between the collimator and the polymer polarization grating, which can increase the dynamic range of the VOA to 0-35 dB. With reference to the accompanying drawings, an embodiment is hereby given. FIG. 10 is a schematic diagram of a structure and a working principle of Embodiment 6 of a VOA according to the present invention. As shown in FIG. 10, on the basis of the embodiment shown in FIG. 8, a polymer polarization grating 28 is further disposed between the collimator 21 and the polymer polarization grating 22. The LC in this embodiment is an ECB-type LC, and can form a Bright-type VOA of a wide dynamic range. Further, if a quarter-wave plate is added between the PPG 2 and the reflector, the Bright-type VOA may be changed into a Dark-type VOA.

A working principle is as follows: When light is incident onto the PPG 28 from the collimator, a left hand circular polarization state and a right hand circular polarization state in the incident light are diffracted to a $+1^{st}$ order and a $-1^{st}$ order respectively, and are emitted as a right hand circular polarization state/a left hand circular polarization state. At the PPG 22, $\mp 1^{st}$ order diffraction occurs for one time separately, and the left hand circular polarization state/right hand circular polarization state is emitted in a direction parallel to an optical axis.

When a low voltage or a zero voltage is applied to the LC 23, the ECB-type LC serves as a quarter-wave plate to adjust a polarization state of the light. When returned by the reflector to the PPG 22, the light is still the left hand circular polarization state/right hand circular polarization state. $\pm 1^{st}$ order diffraction and $\mp 1^{st}$ order diffraction occur on the PPG 28 and the PPG 22 respectively, and the light is directly emitted back into the collimator and an output fiber. In this case, attenuation of the VOA is minimal.

When a high voltage $V_H$ is applied to the LC 23, the polarization state does not change after the light passes through the LC 23. A polarization attribute changes when the light is returned to the PPG 22 through the reflector again. $\mp 1^{st}$ order diffraction and $\pm 1^{st}$ order diffraction occur on the PPG 22 and the PPG 28 respectively, and the light is emitted in parallel far away from an axis and cannot return to the collimator 21 and the output fiber. In this case, the attenuation of the VOA is maximal.

When the voltage applied to both ends of the LC 23 changes within a range from a low voltage/zero voltage to $V_H$, an attenuation value of the light increases with increase of the voltage, thereby adjusting an attenuation extent of the VOA.

In this embodiment, two levels of PPGs are used, and the light returned to the collimator is diffracted by the PPG for two times, and therefore, a wide dynamic range of attenuation can be implemented. In this embodiment, the dynamic range of the VOA is 0-35 dB.

Figure 11:
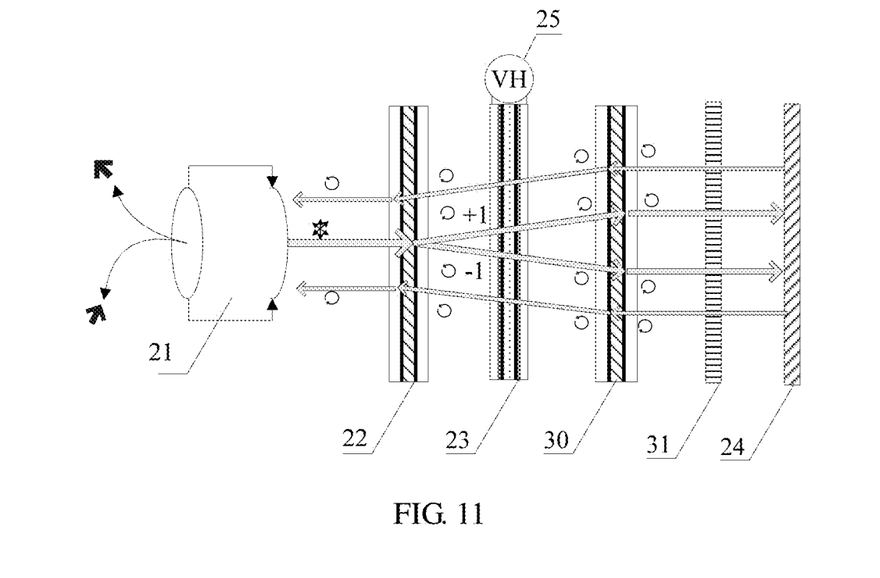
FIG. 11 is a schematic diagram of a structure and a working principle (with a high voltage applied to an LC) of Embodiment 7 of a VOA according to the present invention.
Figure 12:
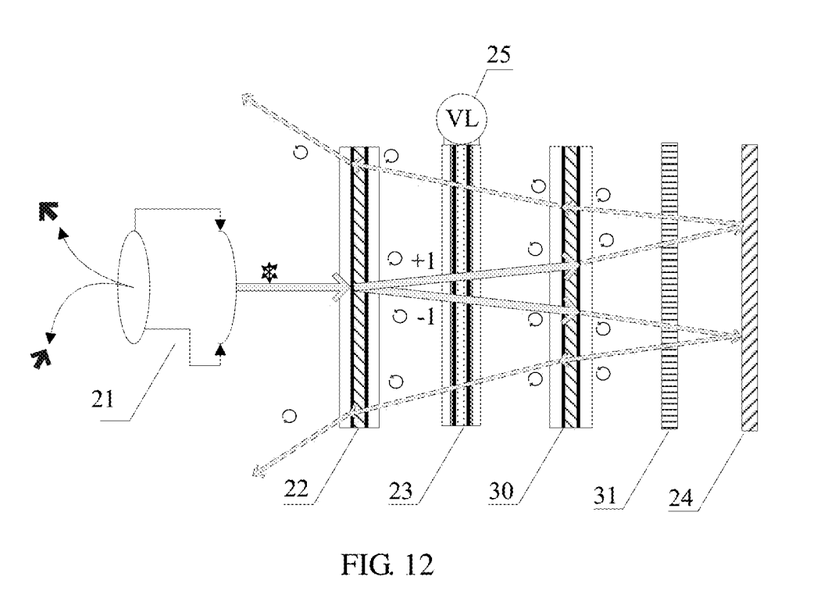
FIG. 12 is a schematic diagram of a structure and a working principle (with a low voltage or zero voltage applied to an LC) of Embodiment 7 of a VOA according to the present invention.

Further, on the basis of the embodiment shown in FIG. 8, in order to make the dynamic range of the VOA be up to 0~35 dB, FIG. 11 is a schematic diagram of a structure and a working principle (with a high voltage applied to an LC) of Embodiment 7 of a VOA according to the present invention; and FIG. 12 is a schematic diagram of a structure and a working principle (with a low voltage or zero voltage applied to an LC) of Embodiment 7 of a VOA according to the present invention. As shown in FIG. 11 and FIG. 12, the LC is an ECB-type LC, and a PPG 30 and quarter-wave plate 31 are further disposed between the LC 23 and the reflector successively.

A working principle is as follows:

When light is incident onto the PPG 22 from the collimator 21, a left hand circular polarization state component and a right hand circular polarization state component in incident light are diffracted to a $+1^{st}$ order and a $-1^{st}$ order respectively, and are emitted as a right hand circular polarization state/a left hand circular polarization state.

As shown in FIG. 11, when a high voltage $V_H$ is applied to the LC 23, the ECB-type LC does not adjust a polarization state of the light, and the light arrives at the PPG 30 as a right hand circular polarization state/left hand circular polarization state and undergoes $\mp 1^{st}$ order diffraction. The left hand circular polarization state/right hand circular polarization state is emitted at an angle of a direction parallel to an optical axis. When passing through the quarter-wave plate and the reflector and returning to the PPG 30 again, the light is still the left hand circular polarization state/right hand circular polarization state. On the PPG 30, $\pm 1^{st}$ order diffraction occurs. When arriving at the PPG 22, the emitted right hand circular polarization state/left hand circular polarization state is diffracted to the $\mp 1^{st}$ orders once again, and is emitted in the direction parallel to the optical axis and is returned to an output collimator 21. In this case, attenuation of the VOA is minimal.

As shown in FIG. 12, when a low voltage VL is applied to the LC 23, the ECB-type LC serves as a half-wave plate and adjusts the polarization state of the light. The light arrives at the PPG 30 as a left hand circular polarization state/right hand circular polarization state, undergoes $\pm 1^{st}$ order diffraction once again, and is emitted at a large angle and is no longer able to return to the collimator 21. In this case, the attenuation of the VOA is maximal.

When the voltage applied to both ends of the LC 23 changes within a $V_L$-$V_H$ range, an attenuation value of the light decreases with increase of the voltage, thereby adjusting an attenuation extent of the VOA. In this case, a probability η of diffracting the incident light to the $\pm 1^{st}$ orders is expressed by the following formula (7).

$$\eta = \cos^2\left(\frac{\pi \Delta n d}{\lambda}\right) \quad (7)$$

In this embodiment, two levels of PPGs are also used, and diffraction occurs for two times, and an IL may be up to 0-35 dB.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A variable optical attenuator comprising:
a collimator;
a switchable polarization grating (SPG);
a reflector; and
a voltage controller for adjusting a voltage between electrodes at both ends of a liquid crystal layer of the SPG,
wherein the collimator, the SPG, and the reflector are disposed successively,
wherein the collimator is configured to receive incident light and output the incident light to the SPG,
wherein the SPG is configured to diffract the incident light for one time and then perform emission onto the reflector,
wherein the SPG is further configured to diffract, for one time, a beam reflected back by the reflector, and then emit resulting diffracted light, and
wherein the collimator is further configured to receive the diffracted light and output the diffracted light.

2. The variable optical attenuator according to claim 1, wherein when the voltage controller adjusts a voltage at both ends of the SPG to a low voltage or a zero voltage, the SPG is configured to diffract the incident light for one time and then perform emission onto the reflector by:
performing, by the SPG, $+1^{st}$ order diffraction on a left hand circular polarization state in the incident light for one time so that the polarization state changes to a right hand circular polarization state, and then performing emission onto the reflector,
performing, by the SPG, $-1^{st}$ order diffraction on a right hand circular polarization state in the incident light for one time so that the polarization state changes to a left hand circular polarization state, and then performing emission onto the reflector, and
reflecting, by the reflector, the right hand circular polarization state/left hand circular polarization state in the received incident light into a left hand circular polarization state/right hand circular polarization state, and then performing emission onto the SPG.

3. The variable optical attenuator according to claim 2, wherein that the SPG is further configured to diffract, for one time, a beam reflected back by the reflector, and then emit resulting diffracted light to the collimator comprises:
performing, by the SPG, $+1^{st}$ order diffraction, for one time, on the left hand circular polarization state reflected back by the reflector, so that the polarization state changes to a right hand circular polarization state, and then performing emission in a direction parallel to an optical axis, and
performing, by the SPG, $-1^{st}$ order diffraction, for one time, on the right hand circular polarization state reflected back by the reflector, so that the polarization state changes to a left hand circular polarization state, and then performing emission in the direction parallel to the optical axis.

4. The variable optical attenuator according to claim 3, wherein when the voltage controller adjusts the voltage at both ends of the SPG to a high voltage, the SPG is configured to diffract the incident light for one time and then perform emission onto the reflector by:
performing, by the SPG, $0^{th}$ order diffraction on the left hand circular polarization state/right hand circular polarization state in the incident light for one time, and then performing emission onto the reflector, and
directly reflecting, by the reflector, diffracted light, which is emitted after the SPG performs the $0^{th}$ order diffraction for one time, back to the collimator.

5. The variable optical attenuator according to claim 1, wherein a quarter-wave plate is further disposed between the SPG and the reflector;
wherein when the voltage controller adjusts the voltage at both ends of the SPG to a low voltage or a zero voltage, the SPG is configured to diffract the incident light for one time and then perform emission onto the reflector by:
performing, by the SPG, $+1^{st}$ order diffraction on the left hand circular polarization state in the incident light for one time so that the polarization state changes to a right hand circular polarization state, and then performing emission onto the reflector through the quarter-wave plate, and
performing, by the SPG, $-1^{st}$ order diffraction on the right hand circular polarization state in the incident light for one time so that the polarization state changes to a left hand circular polarization state, and then performing emission onto the reflector through the quarter-wave plate, wherein the quarter-wave plate and the reflector are configured to reflect the right hand circular polarization state/left hand circular polarization state in the received incident light into a right hand circular polarization state/left hand circular polarization state, and then perform emission onto the SPG.

6. The variable optical attenuator according to claim 5, wherein that the SPG is further configured to diffract, for one time, a beam reflected back by the reflector, and then emit resulting diffracted light comprises:
performing, by the SPG, $+1^{st}$ order diffraction, for one time, on the left hand circular polarization state reflected back by the reflector, so that the polarization state changes to a right hand circular polarization state, and then performing oblique emission at a specific angle, and
performing, by the SPG, $-1^{st}$ order diffraction, for one time, on the right hand circular polarization state reflected back by the reflector, so that the polarization state changes to a left hand circular polarization state, and then performing oblique emission at a specific angle.

7. The variable optical attenuator according to claim 6, wherein when the voltage controller adjusts the voltage at both ends of the SPG to a high voltage, that the SPG is configured to diffract the incident light for one time and then perform emission onto the reflector by:
performing, by the SPG, $0^{th}$ order diffraction on the left hand circular polarization state/right hand circular polarization state in the incident light for one time, and then performing emission onto the reflector, and
directly reflecting, by the reflector, the diffracted light, which is emitted after the SPG performs the $0^{th}$ order diffraction for one time, back to the collimator.

8. The variable optical attenuator according to claim 7, wherein a liquid crystal part is further disposed between the SPG and the quarter-wave plate, and wherein the voltage controller is further configured to adjust a voltage between electrodes at both ends of the liquid crystal part, and the liquid crystal part is configured to implement wavelength dependent loss compensation.

9. A variable optical attenuator comprising:
a collimator;
a polymer polarization grating (PPG);

a liquid crystal part (LC);
a reflector; and
a voltage controller for adjusting a voltage between electrodes at both ends of the LC,
wherein the collimator, the PPG, the LC, and the reflector are disposed successively,
wherein the collimator is configured to receive incident light and output the incident light to the PPG,
wherein the PPG is configured to diffract the incident light for one time and then perform emission onto the reflector through the LC,
wherein the LC is configured to change a polarization state of a beam with a voltage change;
wherein the PPG is further configured to diffract, for one time, a beam that is reflected back by the reflector and whose polarization state is changed by the LC, and then emit resulting diffracted light; and
wherein the collimator is further configured to receive the diffracted light and output the diffracted light.

10. The variable optical attenuator according to claim 9, wherein the LC is an electrically controlled birefringence ECB-type LC;
wherein when the voltage controller adjusts a voltage at both ends of the ECB-type LC to a low voltage or a zero voltage, the ECB-type LC is a quarter-wave plate, and the PPG is configured to diffract the incident light for one time and then perform emission onto the reflector through the LC by:
performing, by the PPG, +1$^{st}$ order diffraction on a left hand circular polarization state in the incident light for one time so that the polarization state changes to a right hand circular polarization state, and then performing emission onto the reflector through the LC,
performing, by the PPG, −1$^{st}$ order diffraction on a right hand circular polarization state in the incident light for one time so that the polarization state changes to a left hand circular polarization state, and then performing emission onto the reflector through the LC, and
reflecting, at the LC and the reflector, the right hand circular polarization state/left hand circular polarization state in the received incident light into a right hand circular polarization state/left hand circular polarization state, and then performing emission onto the PPG.

11. The variable optical attenuator according to claim 10, wherein the PPG is further configured to diffract, for one time, a beam that is reflected back by the reflector and whose polarization state is changed by the LC, and then emit resulting diffracted light by:
performing, by the PPG, +1$^{st}$ order diffraction, for one time, on the left hand circular polarization state reflected back by the reflector, so that the polarization state changes to a right hand circular polarization state, and then performing oblique emission at a specific angle, and
performing, by the PPG, −1$^{st}$ order diffraction, for one time, on the right hand circular polarization state reflected back by the reflector, so that the polarization state changes to a left hand circular polarization state, and then performing oblique emission at a specific angle.

12. The variable optical attenuator according to claim 11, wherein when the voltage controller adjusts the voltage at both ends of the ECB-type LC to a high voltage, the ECB-type LC is similar to a wave plate whose phase difference is 0, and that the PPG is configured to diffract the incident light for one time and then perform emission onto the reflector through the LC by:
performing, by the PPG, +1$^{st}$ order diffraction on the left hand circular polarization state in the incident light for one time so that the polarization state changes to a right hand circular polarization state, and then performing emission onto the reflector through the LC,
performing, by the PPG, −1$^{st}$ order diffraction on the right hand circular polarization state in the incident light for one time so that the polarization state changes to a left hand circular polarization state, and then performing emission onto the reflector through the LC, and
reflecting, by the LC and the reflector, the right hand circular polarization state/left hand circular polarization state in the received incident light into a left hand circular polarization state/right hand circular polarization state, and then performing emission onto the PPG.

13. The variable optical attenuator according to claim 12, wherein the PPG is further configured to diffract, for one time, a beam that is reflected back by the reflector and whose polarization state is changed by the LC, and then emit resulting diffracted light by:
performing, by the PPG, +1$^{st}$ order diffraction, for one time, on the left hand circular polarization state reflected back by the reflector, so that the polarization state changes to a right hand circular polarization state, and then performing emission in a direction parallel to an optical axis, and
performing, by the PPG, −1$^{st}$ order diffraction, for one time, on the right hand circular polarization state reflected back by the reflector, so that the polarization state changes to a left hand circular polarization state, and then performing emission in the direction parallel to the optical axis.

14. The variable optical attenuator according to claim 13, wherein a quarter-wave plate is further disposed between the ECB-type LC and the reflector.

15. The variable optical attenuator according to claim 9, wherein the LC is a vertical alignment VA-type LC.

16. The variable optical attenuator according to claim 9, wherein a PPG is further disposed between the collimator and the PPG,
wherein ±1$^{st}$ order diffraction and ∓1$^{st}$ order diffraction occur for one time separately when the incident light output by the collimator passes through the two PPGs successively, and
wherein ∓1$^{st}$ order diffraction and ±1$^{st}$ order diffraction occur for one time separately when light reflected back by the reflector and the LC passes through the two PPGs successively.

17. The variable optical attenuator according to claim 9, wherein the LC is an electrically controlled birefringence ECB-type LC, a PPG and a quarter-wave plate are further successively disposed between the ECB-type LC and the reflector,
wherein when the voltage controller adjusts a voltage at both ends of the ECB-type LC to a high voltage, the ECB-type LC does not adjust a polarization state of the light,
wherein when the voltage controller adjusts the voltage at both ends of the ECB-type LC to a low voltage or a zero voltage, the ECB-type LC serves as a half-wave plate to adjust the polarization state of the light, wherein $\pm 1^{st}$ order diffraction and $\mp 1^{st}$ order diffraction occur for one time separately when the incident light output by the collimator passes through the two PPGs successively, and wherein $\mp 1^{st}$ order diffraction and $\pm 1^{st}$ order diffraction occur for one time separately when light reflected back by the reflector and the quarter-wave plate passes through the two PPGs successively.

* * * * *